(12) United States Patent
Yamashita et al.

(10) Patent No.: US 10,742,851 B2
(45) Date of Patent: Aug. 11, 2020

(54) CAPTURED IMAGE DECISION DEVICE

(71) Applicant: AISIN SEIKI KABUSHIKI KAISHA, Kariya-shi, Aichi-ken (JP)

(72) Inventors: Norichika Yamashita, Kariya (JP); Kosuke Hirano, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 16/309,129

(22) PCT Filed: Mar. 24, 2017

(86) PCT No.: PCT/JP2017/011926
§ 371 (c)(1),
(2) Date: Dec. 12, 2018

(87) PCT Pub. No.: WO2017/217062
PCT Pub. Date: Dec. 21, 2017

(65) Prior Publication Data
US 2019/0312993 A1 Oct. 10, 2019

(30) Foreign Application Priority Data

Jun. 13, 2016 (JP) .................................. 2016-116882

(51) Int. Cl.
*H04N 5/10* (2006.01)
*B60R 1/00* (2006.01)
*H04N 7/18* (2006.01)
*H04N 17/00* (2006.01)

(52) U.S. Cl.
CPC .................. *H04N 5/10* (2013.01); *B60R 1/00* (2013.01); *H04N 7/18* (2013.01); *H04N 17/00* (2013.01); *B60R 2300/806* (2013.01)

(58) Field of Classification Search
CPC . H04N 5/10; H04N 17/00; H04N 7/18; B60R 1/00; B60R 2300/806
See application file for complete search history.

(56) References Cited

U.S. PATENT DOCUMENTS

2007/0070219 A1* 3/2007 Morimoto .............. H04N 5/232
348/231.99

FOREIGN PATENT DOCUMENTS

JP 08-317313 A 11/1996
JP 2009-044572 A 2/2009

* cited by examiner

*Primary Examiner* — Nam D Pham
(74) *Attorney, Agent, or Firm* — Sughrue Mion, PLLC

(57) ABSTRACT

A captured image decision device includes a synchronizing signal extraction section extracting a vertical synchronizing signal and a horizontal synchronizing signal for use in displaying a captured image captured by a camera, a time measurement section measuring a pulse interval time period of the vertical synchronizing signal, a segment area setting section configured to divide a frame of the captured image displayed according to the pulse interval time period by a horizontal virtual line, thus setting a plurality of segment areas divided by the virtual line, a pulse number measurement section measuring a pulse number of the horizontal synchronizing signal corresponding to each segment area, and a decision section deciding whether an affirmation condition of the pulse number measured by the pulse number measurement section being equal to or greater than a predetermined value is satisfied or not.

4 Claims, 5 Drawing Sheets

Fig.3

CAPTURED IMAGE DECISION DEVICE

CROSS REFERENCE TO RELATED APPLICATIONS

This application is a National Stage of International Application No. PCT/JP2017/011926 filed Mar. 24, 2017, claiming priority based on Japanese Patent Application No. 2016-116882 filed Jun. 13, 2016.

TECHNICAL FIELD

The present invention relates to a captured image decision device for deciding display abnormality in a captured image captured by a camera.

BACKGROUND ART

When driving assistance is provided by displaying a captured image of a vehicle-mounted camera on a monitor screen inside a vehicle, there is known a captured image decision device for deciding display abnormality present in the captured image (see e.g. Patent Document 1).

According to the captured image decision device disclosed in Patent Document 1, color information obtained by a predetermined sampling interval (e.g. a predetermined number of times in one second) set with using a synchronizing signal inputted to a displaying section are added up and if the added-up value in one second is smaller than a first threshold value, the device decides this as display abnormality (black screen state).

CITATION LIST

Patent Literature

Patent Document 1: Japanese Unexamined Patent Application Publication No. 2009-44572

SUMMARY OF INVENTION

Technical Problem

However, with such conventional image displaying device, since display abnormality is decided based on an added-up value of color signals obtained in one second, although display abnormality of the entire captured image can be decided, display abnormality present at a limited portion of the captured image (e.g. in some horizontal lines) cannot be decided. As a result, there is no way but not displaying the entire captured image at all, thus being inconvenient when providing driving assistance.

Then, there is a need for a captured image decision device capable of efficiently detecting display abnormality at a portion of a captured image.

Solution to Problem

According to a characterizing feature of a captured image decision device, the captured image decision device comprises: a synchronizing signal extraction section extracting a vertical synchronizing signal and a horizontal synchronizing signal for use in displaying a captured image captured by a camera; a time measurement section measuring a pulse interval time period of the vertical synchronizing signal; a segment area setting section configured to divide a frame of the captured image displayed according to the pulse interval time period by a horizontal virtual line, thus setting a plurality of segment areas divided by the virtual line; a pulse number measurement section measuring a pulse number of the horizontal synchronizing signal corresponding to each segment area; and a decision section deciding whether an affirmation condition of the pulse number measured by the pulse number measurement section being equal to or greater than a predetermined value is satisfied or not.

In general, in order to display a captured image of a camera on e.g. a monitor screen of a vehicle, there are employed a vertical synchronizing signal and a horizontal synchronizing signal for synchronizing output timing of video signals. In the inventive arrangement described above, such vertical synchronizing signal and horizontal synchronizing signal are extracted and these extracted vertical synchronizing signal and horizontal synchronizing signal are used for making the decision. Namely, since the arrangement makes the decision not by using the color signals of each pixel, but by using the horizontal synchronizing signals set for each horizontal line on the frame, the arrangement makes reduction in the computation amount advantageously.

Further, according to the inventive arrangement, the arrangement measures a pulse interval time period of the vertical synchronizing signal and sets segment areas obtained by dividing the frame of the captured image displayed according to this pulse interval time by a horizontal virtual line and decides whether the pulse number of the horizontal synchronizing signal corresponding to this segment area is equal to or greater than a predetermined value or not. Namely, if the pulse number of the horizontal synchronizing signal corresponding to the segment area of the captured image falls below a predetermined value, the arrangement decides that a portion of the horizontal line included in the segment area is not being displayed normally.

As a result, it becomes possible to rendering only a segment area of the captured image non-displayed, rather than rendering the entire captured image non-displayed. For instance, if an image of vicinity of a bumper of the vehicle is normal, this image of the bumper vicinity alone can be displayed, thus allowing efficient driving assistance. In this way, it has become possible to provide a captured image decision device capable of efficiently detecting display abnormality at a portion of a captured image.

According to a further characterizing feature: there is provided a priority order setting section setting an order for displaying the plurality of segment areas; and the decision section outputs a non-displaying signal for not displaying the captured image corresponding to the segment area set with a priority order equal to or less than the priority order of the segment area decided as not satisfying the affirmation condition. In this, preferably, the priority order setting section sets the priority order higher for the segment areas located on a lower side of the captured image.

By the above arrangement of not displaying the captured image corresponding to all the segment areas set with a priority order equal to or less than the priority order of the segment area decided as not satisfying the affirmation condition, it is possible to display only the lower portion of the monitor screen having high displaying priority, for instance. On the other hand, if case the priority orders of the segment areas are all the same, the entire monitor screen will be rendered non-displaying state. As a result, it becomes possible to prevent displaying of a "disrupted" image non-displaying only an intermediate portion of the monitor screen, so no feeling of unnaturalness will be given to the user.

According to a further characterizing feature, a masking signal is outputted for effecting a masking process for the captured image corresponding to the segment area not satisfying the affirmation condition.

With the above-described arrangement of masking the segment area not satisfying the affirmation condition, it becomes possible to cause the user to view attentively only the displayed area of the captured image on the monitor screen.

DESCRIPTION OF EMBODIMENTS

Next, an embodiment of a captured image decision device relating to the present invention will be explained with reference to the accompanying drawings. In the instant embodiment, there will be explained one example in which with use of a captured image decision device X, a captured image PI captured by a vehicle-mounted camera 1 (one example of "camera") provided at a rear portion of a vehicle is displayed as a display screen image VI on a monitor screen in the vehicle. However, it is understood that the present invention is not limited to the following embodiment, but various modifications thereof are possible within a range not deviating from its essence.

The vehicle-mounted camera 1 is a camera configured to capture from 15 to 30 frames of two-dimensional images per second in time series with using an image capturing (or imaging) device such as a CCD (charge coupled device) or a CIS (CMOS image sensor) and to effect digital conversion thereof and to output video data (captured image PI) in real time. Incidentally, in this embodiment, this will be explained as a vehicle-mounted camera 1 configured to capture 30 frames of image per second.

Figure 3:
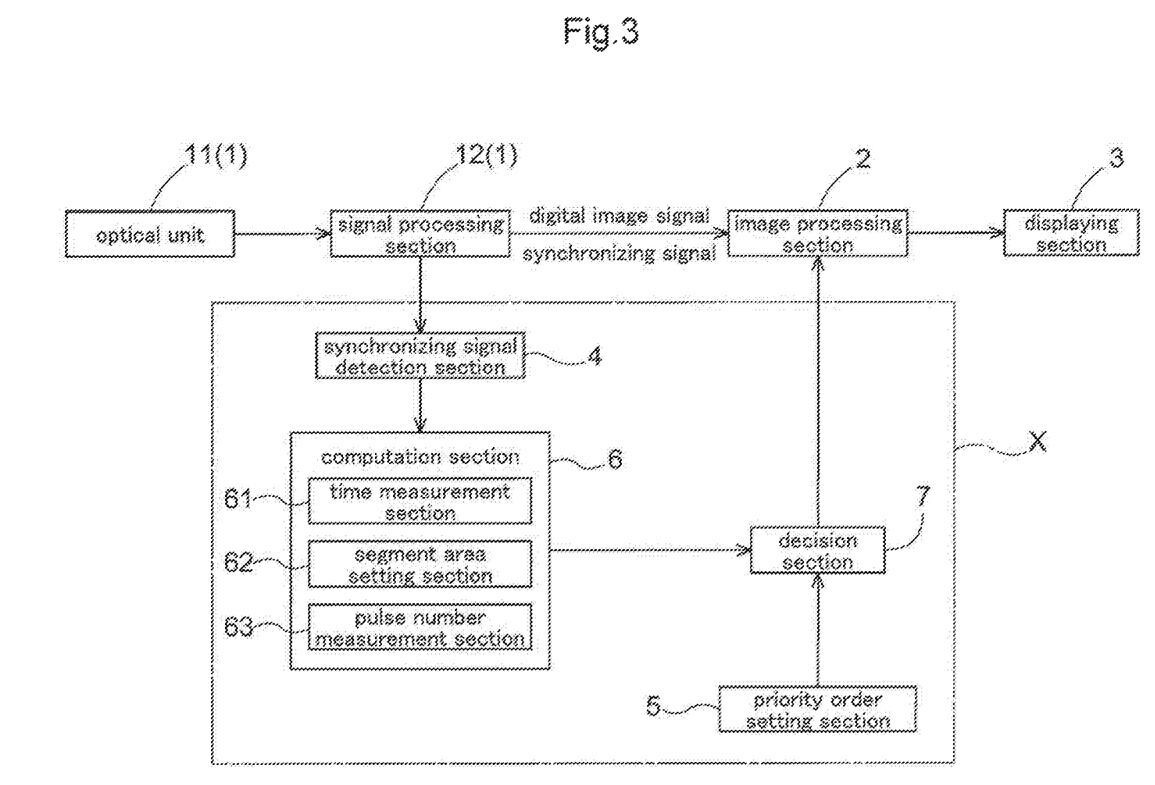
FIG. 3 is a block diagram showing one example of functions of the captured image decision device.

As shown in FIG. 3, the vehicle-mounted camera 1 includes an optical unit 11 constituted of a lens, an optical path, etc., and a signal processing section 12 constituted of an image sensor, a signal processing circuit, a synchronizing signal generation circuit, etc. In this optical unit 11 employed in the instant embodiment, the lens is a wide-angle lens and there is provided a lens barrel (optical path) for preventing ambient light from entering the passageway from the lens to a light receiving face of the image sensor.

The signal processing section 12 comprises a semiconductor chip integrating the image sensor for converting a view around the vehicle into analog image signals by photoelectric conversion, the signal processing circuit for converting the analog signals into digital signals by an A/D converter, the synchronizing signal generation circuit for generating a vertical synchronizing signal and a horizontal synchronizing signal. The digital image signals converted by the signal processing circuit include a luminance signal and a color difference signal for each pixel. As this digital signal is synchronized by the vertical synchronizing signal and the horizontal synchronizing signal, the captured image PI is produced.

Figure 1:
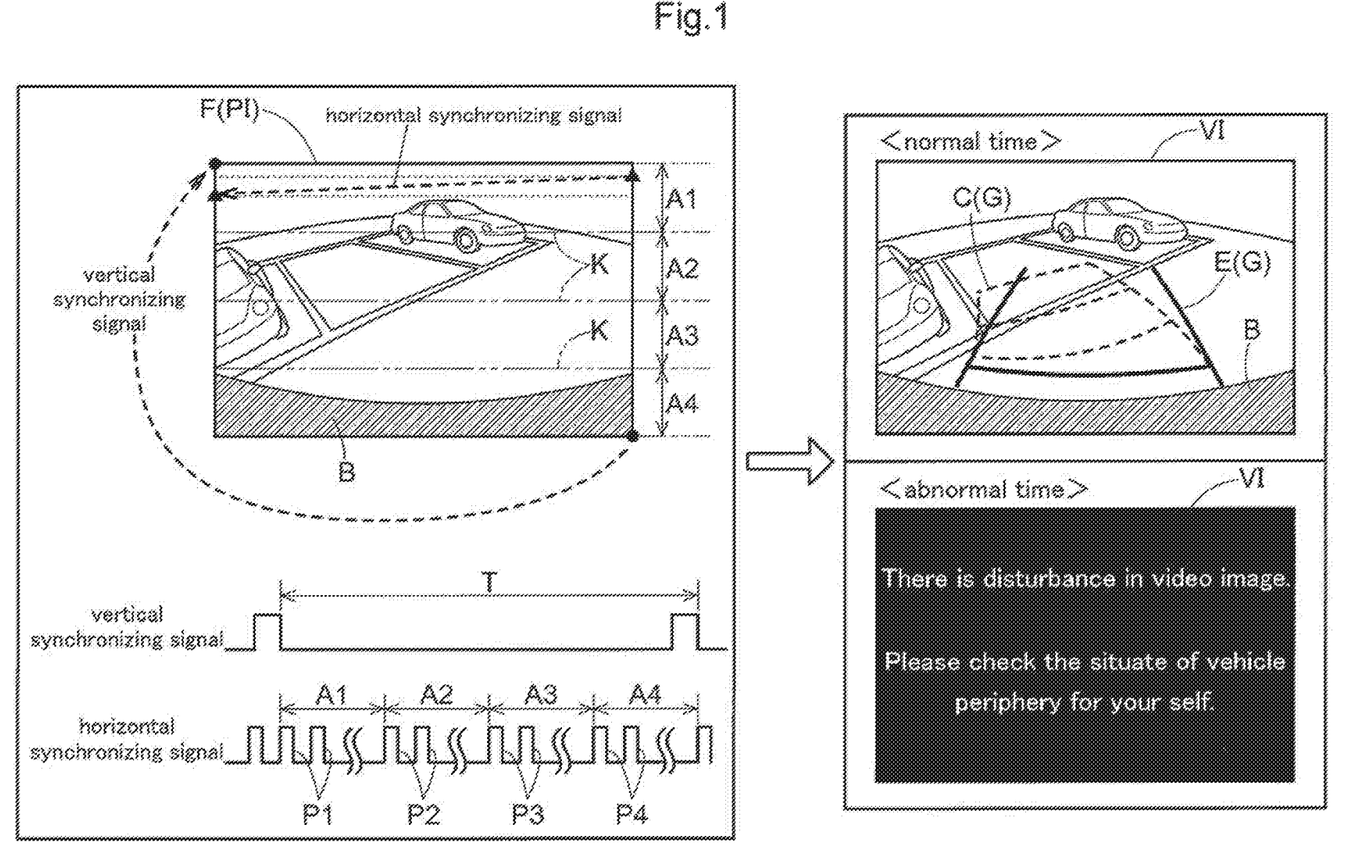
FIG. 1 is a view for explaining an image processing by a captured image decision device.

As shown in FIG. 1, the vertical synchronizing signal is comprised of pulses having rectangular waveform, with each pulse providing a movement in the vertical direction of the captured image PI (in the illustration a movement from the right lower side to the left upper side in the view). Namely, a pulse interval time period T of this vertical synchronizing signal corresponds to a reciprocal number of the frame rate of the captured image PI. Further, the horizontal synchronizing signal is comprised of pulses having rectangular waveforms, with each pulse providing a movement in the horizontal direction of the captured image PI (in the illustration, a movement to the left terminal end of a horizontal line immediately below). Namely, a pulse number Pi of the horizontal synchronizing signal corresponds to the number of image lines (horizontal lines) in the horizontal direction of the captured image PI. In the case of the signal processing section 12 used in the instant embodiment, the frequency of the vertical synchronizing signal is set as 30 Hz, and the frequency of the horizontal synchronizing signal is set as 24 kHz, respectively. Namely, 30 frames F of the captured images PI will be produced per second and for each frame F of the captured image, 800 (eight hundreds) horizontal lines are generated.

As shown in FIG. 3, the captured image PI outputted from the signal processing section 12 is subjected to a correction process by the image processing section 2 and then outputted as a display screen image VI at a displaying section 3. Incidentally, it was explained that as the digital signal converted by the signal processing section 12 is synchronized by the vertical synchronizing signal and the horizontal synchronizing signal to produce the captured image PI. However, the captured image PI, when shown to the outside, will assume the form of the display screen image VI. Namely in the instant embodiment, the captured image PI after the correction process is defined as the "display screen image" VI. So, the digital signal converted by the signal processing section 12 is synchronized by the vertical synchronizing signal and the horizontal synchronizing signal to produce the display screen image VI.

As shown in FIG. 1, as an example of the image processing section 2 used in the instant embodiment, the display screen image VI is produced by superposing a guide image G on the captured image PI. As some examples of such guide image G, an expected advancing line C (shown with dotted line) which changes according to steering of the vehicle, a vehicle extension line E (shown with solid line) which is drawn at a fixed position irrespectively of steering angle and so on can be cited. The image processing section 2 inputs information of various sensors constituted of a steering sensor, a shift sensor, etc., so the position of the guide image G will be changed in accordance with a driving situation of the driver. This allows the driver to effect parking smoothly at a parking space while viewing the display screen image VI.

The displaying section 3 can be used e.g. also as a monitor device of a navigation system. This monitor device can be a liquid crystal display for instance and can include a touch panel operable by a finger of the driver.

With such display screen image VI produced as above, an image distortion or disturbance (display abnormality) may sometimes occur at a portion of the video image due to absence of normal output of the horizontal synchronizing signal. With occurrence of such image distortion, a portion of the image will be missing, so there is the risk of appropriate grasping of the surrounding situation such as an obstacle becoming impossible. Namely, it is important to call the driver's attention to urge the driver himself/herself to check the vehicle surrounding situation or to communicate accurate information to the driver by displaying only non-disturbed image according to the situation when appropriate.

Then, in the instant embodiment, the captured image decision device X is used to detect efficiently such "display abnormality" occurring at a portion of the captured image PI. As shown in FIG. 3, this captured image decision device X includes a synchronizing signal extraction section 4, a computation section 6 and a decision section 7. These respective functional sections are constituted of software or cooperation of software and hardware including a CPU as a core component thereof, a memory, etc. for executing various processes. Incidentally, the respective functional sections need not have respectively independent physical constructions. Rather, realization of the respective functions alone will be sufficient. That is, the respective functional sections can be combined or can be incorporated in the signal processing section 12. Moreover, the respective functional sections can be omitted when appropriate as long as omission thereof does not result in deviation from the essential spirit of the present invention.

The synchronizing signal extraction section 4 extracts the vertical synchronizing signal and the horizontal synchronizing signal for use in displaying the captured image PI of the vehicle-mounted camera 1 on the display screen image VI. These vertical synchronizing signal and the horizontal synchronizing signal each is extracted for each frame F as pulses having rectangular waveforms.

The computation section 6 includes a time measurement section 61, a segment area setting section 62, and a pulse number measurement section 63. The time measurement section 61 measures a pulse interval time period T. This pulse interval time T is a time in which one frame F is displayed and is set to 33.3 ms (micro second) in the instant embodiment. The segment area setting section 62 divides (i.e. segments) the frame F of the captured image P displayed according to the pulse interval time period T by a horizontal virtual line K, thus setting a plurality of segment areas Ai segmented by the virtual line K (see FIG. 1). In the instant embodiment the frame F is divided by three such virtual lines K, so four segment areas Ai (i=1-N, N=4) in total are set in the vertical direction. Further, these segment areas Ai are disposed side by side equidistantly in the vertical direction of the frame F, and one segment area Ai has a segment synchronization time (T/N) obtained by equally dividing the pulse interval time period T by 4 (four).

The pulse number measurement section 63 measures (counts) the pulse number Pi (i=1-N, N=4) of the horizontal synchronizing signal corresponding to the segment area Ai segmented by the segment area setting section 62. In other words, the pulse number measurement section 63 is configured to measure (count) the respective pulse number Pi of the horizontal synchronizing signal in the segment synchronization time period (T/N) obtained by dividing the pulse interval time period T by the segment area number N which is the total number of the segment areas Ai. The respective pulse number Pi of the horizontal synchronizing signal measured by this pulse number measurement section 63 is correlated with the respective segment areas Ai.

The decision section 7 decides whether the pulse number Pi of the horizontal synchronizing signal for the respective segment area Ai measured by the pulse number measurement section 63 satisfies an "affirmation condition" of the pulse number being equal to or greater than a predetermined value or not. As described above, in the instant embodiment, 800 (eight hundreds) horizontal lines are generated for each frame F of the captured image PI. So, the above-described predetermined value will be set as such predetermined number (e.g. 195) that does not allow explicit visual recognition of image disturbance/distortion for 200 (two hundreds) horizontal lines (pulse number Pi) present in one segment area Ai. And, the decision section 7 is configured to output to the image processing section 2 a displaying signal for causing displaying of the segment areas Ai which satisfy the affirmation condition of the respective pulse numbers Pi of the horizontal synchronizing signal being equal to or greater than the predetermined value. Upon receipt of this displaying signal, the image processing section 2 produces the display screen image VI by superposing the guide image G etc. on the segment area Ai in the displayed captured image PI.

In this way, the decision section 7 makes the decision with using the horizontal synchronizing signal set for each horizontal line on the frame F, rather than making the decision by addition of luminance signals or color difference signals for the respective pixel. Thus, the amount of computation can be reduced. Moreover, it is readily possible to grasp image disturbance being caused by abnormality occurring in the horizontal synchronizing signal.

Figure 2:
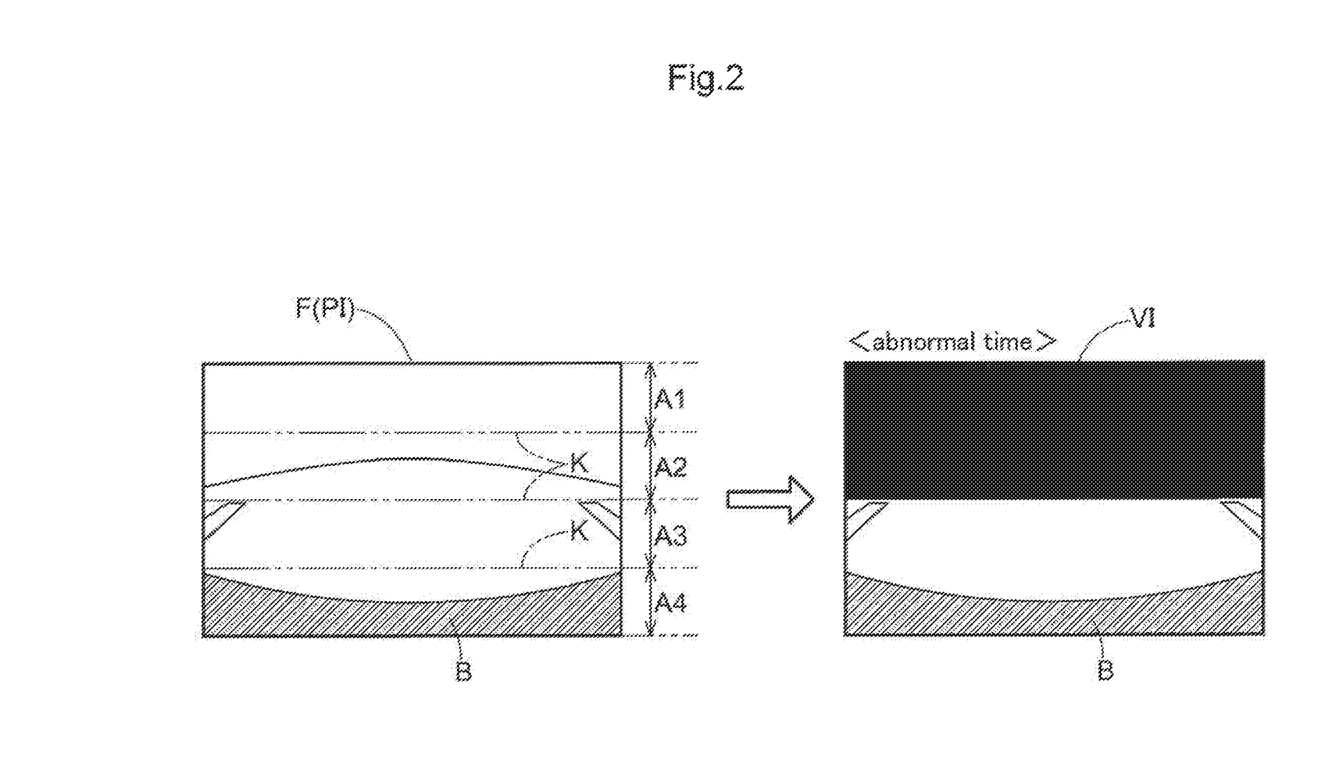
FIG. 2 is a view for explaining the image processing by the captured image decision device.

The captured image decision device X used in the instant embodiment includes a priority order setting section 5 for setting an order of priority for displaying the segment area Ai in the display screen image VI. Specifically, priority orders according to various driving situations of the vehicle are prepared in the form of a map, so that based on information from the sensors and/or the captured image PI, for each frame F, a priority order for segment area Ai is set. For instance, when the vehicle is executing a parking operation, namely, when the shift lever is set to the R range or an image of a parking area or its periphery (a parked vehicle (s), etc.) is shown in the captured image PI of the vehicle-mounted camera 1 (see FIG. 1), all the segment areas Ai will be set with a same priority order. On the other hand, when the vehicle has finished a parking operation, namely, when the shift lever is set to the P range or an image of vicinity of a vehicle bumper B alone is shown in the captured image PI of the vehicle-mounted camera 1 (see FIG. 2), those segment areas Ai present on the lower side of the captured image PI will be set with progressively higher priority orders (in the direction from the segment area A1 toward the segment area A4).

In the case of the captured image decision device X having this priority order setting section 5, the decision section 7 is configured to output a non-displaying signal for not displaying the segment areas Ai (the captured image portion corresponding to the segment area Ai) not satisfying the affirmation condition of the respective pulse number Pi of the horizontal synchronizing signal being equal to or greater than the predetermined value. With this arrangement, at the stage shown in FIG. 1 when the vehicle is executing a parking operation, as the priority order is set equal altogether, if any one of the segment areas Ai does not satisfy the affirmation condition, the entire display screen image Vi (all of the segment areas Ai) will be non-displayed. On the other hand, at the stage shown in FIG. 2 when the vehicle has finished the parking operation, if the segment area A2 alone does not satisfy the affirmation condition, the upper half portion of the display screen image VI (the segment areas A1 and A2) will be non-displayed. In this way, if the image of the vicinity of the bumper B of the vehicle is normal, the image of this bumper B vicinity alone can be displayed when appropriate, whereby efficient driving assistance is made possible.

Moreover, the decision section 7 outputs to the image processing section 2 a masking signal for masking the segment area(s) Ai (the captured image portion corresponding to the segment area(s) Ai) which does (do) not satisfy the affirmation condition. With this masking treatment, in the case of the situation shown in FIG. 1 for instance, the display screen image VI entirely will be blackened. Whereas, in the case of the situation shown in FIG. 2, the upper half of the display screen image VI will be blackened. As a result, the driver will be allowed to view only the displayed area of the captured image PI on the display screen image VI in a reliable manner. Incidentally, the masking treatment is not limited to such blackening of image, but can be whitening of the image or addition of a predetermined graphic image or sign thereto.

Further, there may be additionally provided an informing section informing the driver that a problem is present in the signal processing section 12 of the vehicle-mounted camera 1. In this case, as shown in FIG. 1, for instance, a message: "There is disturbance in the video image. Please check the situation of the vehicle periphery for yourself." may be included in the display screen image VI or informing may be provided in the form of a voice message to that effect, or informing may be provided in both of such forms as well. As a result, the driver can check safety of the surrounding situation without any unnatural feel.

Figure 4:
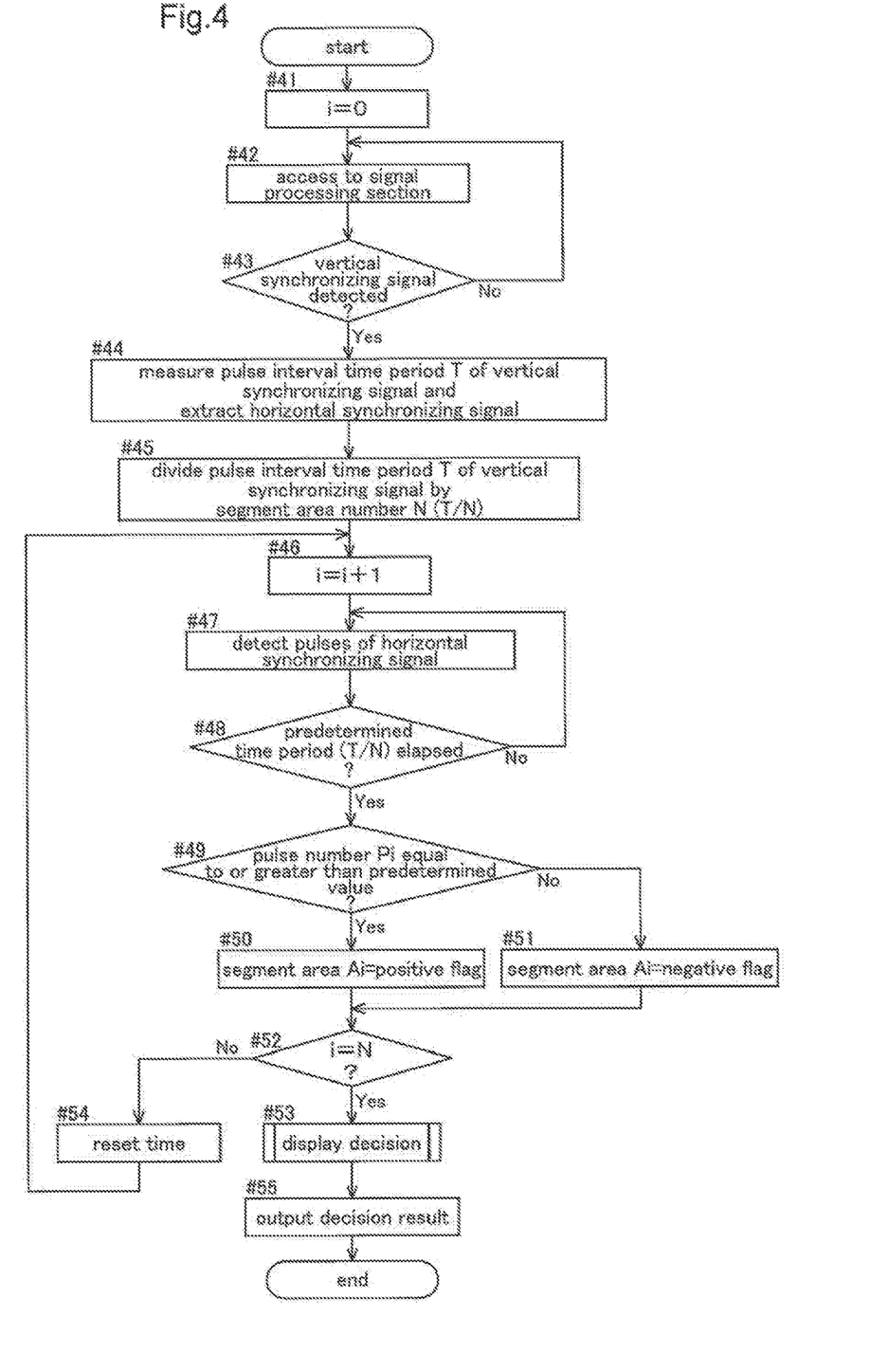
FIG. 4 is a flowchart of a display abnormality decision process.
Figure 5:
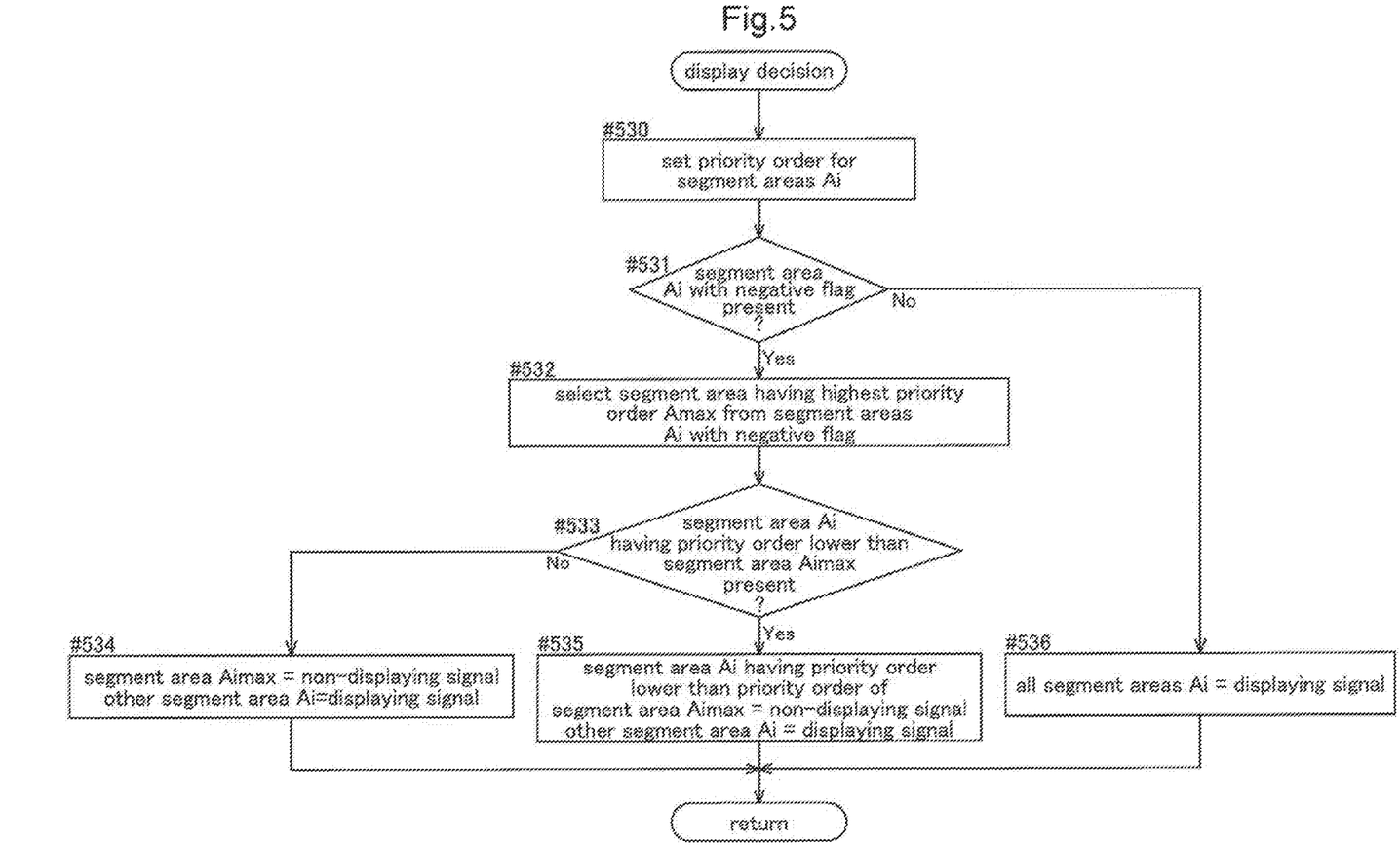
FIG. 5 is a flowchart of a display decision subroutine.

Next, a display abnormality decision process according to the instant embodiment will be explained with reference to FIGS. 4-5. As shown in FIG. 4, firstly, the count number is set as i=0 (#41). Also, an access is made to the signal processing section 12 (#42). If no vertical synchronizing signal is detected (NO decision at #43), then, an access is made again to the signal processing section 12 (#42).

On the other hand, if a vertical synchronizing signal is detected (YES decision at #43), this vertical synchronizing signal is extracted and its pulse interval time period T is measured and also a horizontal synchronizing signal is extracted (#44). Next, the pulse interval time period T is divided by the preset segment area number N to calculate a segment synchronization time period (T/N) (#45). Subsequently, the counter number is incremented to i=1 (#46), and the pulses of the horizontal synchronizing signal for the segment area A1 are detected (#47).

Next, if the segment synchronization time period (T/N) has not yet elapsed as a predetermined time period after the detection of the vertical synchronizing signal (NO decision at #48), the pulses of the horizontal synchronizing signal for the segment area A1 are detected again (#47). On the other hand, if the predetermined time period (T/N) after the detection of the vertical synchronizing signal has elapsed (YES decision at #48), the process decides whether the pulse number P1 detected as the total pulse number of the horizontal synchronizing signal for the segment area A1 is equal to or greater than the predetermined value (P1=195) or not (#49).

If it is decided that the pulse number P1 of the horizontal synchronizing signal for the segment area A1 is equal to or greater than the predetermined value (YES decision at #49), then, a positive flag is set for the segment area A1 (#50). Whereas, if it is decided that the pulse number P1 is smaller than the predetermined value (NO decision at #49), a negative flag is set for the segment area A1 (#51). Next, if the count number i has not yet reached the segment area number N (NO decision at #52), then, the elapsed time period is reset and the count number is incremented as i=i+1 (#46), and the steps #47-#52 will be repeated for the segment area Ai. On the other hand, if the the count number i has reached the segment area number N (YES decision at #52), then, a display decision is executed (#53) and the result of this executed decision is outputted to the image processing section 2 (#55).

Here, a subroutine of the display decision (#53) will be explained with reference to FIG. 5. Priority orders are set for the segment areas Ai set with either the positive flag or the negative flag (#530). Next, if there exists no segment area Ai set with the negative flag (NO decision at #531), this means that the captured image PI is normal. Thus, the decision result will be a displaying signal for displaying all of the segment areas Ai (#536).

On the other hand, if there exist segment areas Ai set with the negative flag (YES decision at #531), then, of these segment areas Ai set with the negative flag, a segment area Aimax having the highest priority order is selected (#532). In this regard, if the priority orders of a plurality of such segment areas Ai are all the same, then, these plurality of segments areas Ai will be selected altogether as the highest priority order segment area Aimax. And, if there exists no segment area Ai having a priority order lower than the highest priority order segment area Aimax (NO decision at #533), then, a non-displaying signal will be provided to this highest priority order segment area Aimax alone (#534). Conversely, if there exists segment areas Ai having a priority order lower than the highest priority order segment area Aimax (YES decision at #533), then, a non-displaying signal will be provided to those segment areas Ai having priority orders lower than the priority order of the highest priority order segment area Aimax and a displaying signal will be provided to the other segment areas Ai (#535). The above-described decision process of display abnormality is effected in real time with each occasion of detection of the vertical synchronizing signal. So, the respective steps will be effected in repetition for each pulse interval time period T.

Incidentally, the respective steps of the display abnormality decision process can be changed in their execution order when appropriate within a range not deviating from the essence of the present invention. Further, the decision result of the display decision subroutine (#53) can be used for decision of a problem in the vehicle-mounted camera 1. The usage thereof is not particularly limited to the use of displaying a captured image PI of the vehicle-mounted camera 1 on the display screen image VI.

OTHER EMBODIMENTS (1) The total number of segment areas Ai is not particularly limited, but can be further segmented within the range of total pulse number of the horizontal synchronizing signal set for one frame F. The greater the number of the segment areas Ai, the greater the degree of segmentation of the displayed area and the non-displayed area of the display screen image VI, so finer monitor display according to the driving situation can be realized. Further, the decision section 7 can be configured to decide whether the pulse number Pi of the horizontal synchronizing signal for each segment area Ai satisfies an affirmation condition of it being equal to the predetermined value (in the foregoing embodiment, 200 (two hundreds) as the horizontal synchronizing signals which should be present in the segment area Ai originally. In the above, case, decision with even higher precision can be effected.

(2) The intervals (vertical widths) of the segment areas Ai need not be equal to each other. For instance, it is possible to arrange such that the higher the priority order of the segment area Ai, the greater the area thereof. In this case, since the display area of the segment area Ai having higher priority order is enlarged, so the display screen image VI can be made more readily visible.

(3) In the foregoing embodiment, it was explained that the display abnormality decision process is effected in real time on each occasion of detection of the vertical synchronizing signal. Instead, the process may be effected by a predetermined interval. In this case, the decision result of the foregoing will be applied until start of the next decision process.

(4) The time measurement section 61 may be configured to measure from the pulse interval time period T of the vertical synchronizing signal preset in the vehicle-mounted camera 1. In this case, once a vertical synchronizing signal is detected, there is no need to wait for detection of a next vertical synchronizing signal. Thus, it becomes possible to shorten the time period until the captured image PI captured by the vehicle-mounted camera 1 is displayed as the display screen image VI.

(5) A storage section can be provided additionally for storing decision results of display abnormality decision processes in accumulation. In this case, it is possible to arrange such that by counting the number of occurrence of display abnormality, if the counted number of occurrence exceeds a predetermined number, this can be informed to the driver as a trouble in the vehicle-mounted camera 1.

INDUSTRIAL APPLICABILITY

The present invention is applicable to a captured image decision device for deciding display abnormality when a captured image captured by a vehicle-mounted camera is to be displayed on a monitor screen of the vehicle, etc.

REFERENCE SIGNS LIST

1: vehicle-mounted camera (camera)
4: synchronizing signal extraction section
5: priority order setting section
7: decision section
61: time measurement section
62: segment area setting section
63: pulse number measurement section
Ai: segment area
F: frame
K: virtual line
PI: captured image
Pi: pulse number
T: pulse interval time period
X: captured image decision device

The invention claimed is:

1. A captured image decision device comprising:
a synchronizing signal extraction section extracting a vertical synchronizing signal and a horizontal synchronizing signal from each frame as pulses having rectangular waveforms for use in displaying a captured image captured by a camera;
a time measurement section measuring a pulse interval time period of the vertical synchronizing signal;
a segment area setting section configured to divide a frame of the captured image displayed according to the pulse interval time period by a horizontal virtual line, thus setting a plurality of segment areas divided by the virtual line;
a pulse number measurement section measuring a pulse number of the horizontal synchronizing signal corresponding to each segment area; and
a decision section deciding whether an affirmation condition of the pulse number measured by the pulse number measurement section being equal to or greater than a predetermined value is satisfied or not.

2. The captured image decision device of claim 1, wherein:
there is provided a priority order setting section setting an order for displaying the plurality of segment areas; and
the decision section outputs a non-displaying signal for not displaying the captured image corresponding to the segment area set with a priority order equal to or less than the priority order of the segment area decided as not satisfying the affirmation condition.

3. The captured image decision device of claim 2, wherein the priority order setting section is configured to set progressively higher priority order for the segment areas located on a lower side of the captured image.

4. The captured image decision device of claim 1, wherein the decision section is configured to output a masking signal for effecting a masking process for the captured image corresponding to the segment area not satisfying the affirmation condition.

* * * * *